United States Patent [19]

Chang et al.

[11] Patent Number: 6,103,645
[45] Date of Patent: Aug. 15, 2000

[54] FOAM FILTER MATERIAL AND PROCESS TO PREPARE FOAM FILTER MATERIAL

[75] Inventors: Benjamin Tai An Chang; Pui Kwan Wong; Troug Van Mai, all of Houston, Tex.

[73] Assignee: Shell Oil Company, Houston, Tex.

[21] Appl. No.: 08/860,142

[22] PCT Filed: Apr. 4, 1997

[86] PCT No.: PCT/US97/06277

§ 371 Date: Jun. 12, 1998

§ 102(e) Date: Jun. 12, 1998

[87] PCT Pub. No.: WO97/37745

PCT Pub. Date: Oct. 16, 1997

Related U.S. Application Data

[60] Provisional application No. 60/014,997, Apr. 8, 1996.

[51] Int. Cl.$^7$ ........................................... B32B 27/30
[52] U.S. Cl. .................. 442/173; 428/304.4; 428/308.4; 428/318.4; 428/320.2; 442/76; 442/164; 442/324
[58] Field of Search .............................. 428/304.4, 308.4, 428/318.4, 320.2; 442/76, 164, 173, 324

[56] References Cited

U.S. PATENT DOCUMENTS

| | | | |
|---|---|---|---|
| 4,522,953 | 6/1985 | Barby et al. | 521/64 |
| 4,603,069 | 7/1986 | Haq et al. | 428/76 |
| 4,624,890 | 11/1986 | Lloyd et al. | 428/290 |
| 4,797,310 | 1/1989 | Barby et al. | 428/71 |
| 5,037,859 | 8/1991 | Williams, Jr. et al. | 521/55 |
| 5,149,720 | 9/1992 | DesMarais et al. | 521/63 |
| 5,171,339 | 12/1992 | Forsten | 55/379 |
| 5,189,070 | 2/1993 | Brownscombe et al. | 521/64 |
| 5,205,938 | 4/1993 | Fiumano et al. | 210/653 |
| 5,210,104 | 5/1993 | Bass et al. | 521/64 |
| 5,318,831 | 6/1994 | Hirama et al. | 428/280 |
| 5,795,921 | 8/1998 | Dyer et al. | 521/146 |

*Primary Examiner*—Helen L. Pezzuto
*Attorney, Agent, or Firm*—Del S. Christensen

[57] ABSTRACT

A method is provided to prepare a filter material, the method comprising the steps of: providing a porous substrate; preparing a high internal phase emulsion wherein the external phase of the emulsion comprises polymerizable monomers, and the internal phase is a non-polymerizable phase; impregnating the high internal phase emulsion into the substrate felt; and polymerizing the polymerizable monomers. A layer of cured foam as is thereby formed on the substrate and within pore volumes of the substrate. The cured foam can have a high porosity, small pore size, and low density, resulting in a filter material having a high efficiency in removal of particles, at a lower pressure drop than alternative high efficiency filter materials.

8 Claims, No Drawings

FOAM FILTER MATERIAL AND PROCESS TO PREPARE FOAM FILTER MATERIAL

This appln claims the benefit of U.S. Provisional Ser. No. 60/014,997, filed Apr. 8, 1996.

TECHNICAL FIELD

This invention relates to a foam impregnated filter material and a process to prepare such a material.

BACKGROUND ART

Polyester felts, usually melt blown, are known to be useful filter materials for applications such as bag filters. These materials are relatively inexpensive, but have relatively large pore sizes because of the diameter polyester threads necessary to result in a sufficiently strong filter material. U.S. Pat. No. 5,205,938 suggests a polyester filter material that is improved by providing a graded pore size. But the porosity of the resultant material can not be as low as what is desired because a high density of fibers is needed to provide sufficiently small volumes between fibers. Very small diameter fibers could theoretically be used to achieve a small pore size with similar densities, but such small fibers are exceedingly difficult to produce and handle. This density, or porosity, results in a greater pressure drop that is desirable.

U.S. Pat. No. 5,318,831 suggests that a small pore size can be achieved by laminating a needle layer to a nonwoven fabric sheet. The needle layer is made of ultra fine fibers. Significant strength is imparted by the nonwoven fabric sheet. A small pore size is still achieved in a felt type of material because of the ultra fine fibers, but the filter material has a greater than desirable density.

Another commercially available filter material consists of a membrane of polytetrafluoroethylene resin laminated to the surface of a felt substrate. This type of membrane can have very small pore openings. The resin membrane is stretched to form small voids within the membrane. The voids can be very small, but the void volume of the membrane is not large, and a significant pressure drop is incurred by a stream passing through the membrane. Further, this type of filter material is relatively expensive, and the resin membrane is prone to breakage.

It would be desirable to provide a filter material wherein a high porosity can be achieved along with a small pore size in a filter layer, thereby minimizing pressure drop through the filter material.

Polymeric open cell foams are used in air and water filters in applications such as air filters for lawn mowers and aircraft. Some of these filters, for example, BRACKET® aircraft air filters, include a plurality of layers of decreasing pore size foam. These filters trap particles within the volume of the foam, and therefore it is difficult to remove the particles from the filter. These filters are not strong enough to be used as filter material in, for example, bag house filters.

Low density foams are porous crosslinked polymer blocks. Such low density porous polymer blocks can be prepared by polymerizing a specific type of water-in-oil emulsion known as high internal phase emulsion having relatively small amounts of a continuous oil phase, the oil phase containing polymerizable monomers, and relatively greater amounts of an internal water phase.

Such low density foams are prepared by a process disclosed in U.S. Pat. No. 4,522,953 by polymerizing and crosslinking monomers in the continuous oil phase of a high internal phase water-in-oil emulsion with a polymerization initiator such as potassium persulfate. Generally, these high internal phase water-in-oil emulsions contain at least 90 weight percent of a water phase as the internal phase. The high ratio water-in-oil emulsions are formed by combining the oil phase with water under moderate shear. In order to obtain this high internal phase water-in-oil emulsion, a surfactant is used to stabilize the emulsion. It is also advantageous to incorporate an electrolyte into the aqueous phase. The amount and type of electrolyte, along with the amount and type of surfactant, effects the pore size, and hydrophobic/hydrophilic character of the cured foam.

Composite foams are disclosed in U.S. Pat. No. 5,037,859. These foams are prepared by first preparing a rigid foam, the rigid foam being a rigid open cell foam, such as a polystyrene foam. The first rigid foam has a relatively large pore size. A second emulsion is then forced into the first rigid foam to form a smaller pore diameter foam within the polystyrene. The resultant composite foams have greater strengths and densities then foams produced from only the second emulsion. The resultant composite foams also retain the better wicking properties of the first foam, but the resultant composite foam is stiff, inflexible, and brittle. It is therefore not an acceptable material for uses such as bag house filters.

It is therefore an object, in one aspect of the present invention, to provide a method to prepare filter materials using a flexible substrate, and a foam cured from high internal phase emulsions impregnated in the felt and/or as a layer along with the substrate. In another aspect, it is an object to provide a filter material having a flexible substrate impregnated with a foam material, the foam material having a mean average pore size in the range of about one to about 100 μm (100 microns). In another aspect of the present invention, it is an object to provide a filter material by the method of the present invention. In another aspect of the present invention it is an object to provide such a filter material having, in the portion of the material that is foam, an average pore diameter in the range of about one to about 100 μm (100 micron) and a density of less than about 0.2 gm/cc.

DESCRIPTION OF THE INVENTION

According to the invention, a filter material is prepared by a method, the method comprising the steps of:
  providing a porous substrate material such as a plexible porous substrate material;
  preparing a high internal phase emulsion wherein the external phase of the emulsion comprises polymerizable monomers, and the internal phase is an immiscible non-polymerizable phase;
  impregnating the high internal phase emulsion into the substrate material; and
  polymerizing the polymerizable hydrocarbon monomers.

The external phase of the emulsion may for example comprise polymerizable hydrocarbon monomers and the internal phase may for example be an aqueous phase.

The foam material within the felt substrate can be prepared with mean pore sizes of between about one and about one hundred microns, and with densities of the foam phase of less than about 0.2 gm/cc. These materials, because of a very high porosity and a small pore size of the foam portion of the filter materials, impart minimal pressure drops to streams passing through the filter. These filter materials are also prepared from inexpensive materials.

DETAILED DESCRIPTION OF THE PREFERRED EMBODIMENTS

Substrates of the present invention may be woven or non-woven materials, including knitted and needle-punched felts. Non-woven materials are preferred because of their generally lower costs and higher porosities. The substrate materials may be made of either organic or inorganic fibers, or combinations thereof.

A substrate for the filter material of the present invention may be one of many available felts of natural or synthetic fibers. Polyester felt is commonly used, and is acceptable in the practice of the present invention. Such a felt substrate is of a relatively open structure, and serves to provide strength to the final filter material.

The substrate of the present invention initially has a porosity, and a volume average pore size greater than that desired of the final filter material. The polymerized foam material of the present invention fills some of the pore volumes with interconnected pores of a smaller size, but a relatively consistent and predictable size that is considerably smaller that the pore size that can be achieved in a woven or nonwoven fabric.

The polymeric foam is provided in the substrate, or as a layer on the substrate, by forming an emulsion of an external phase containing polymerizable monomers and a surfactant, and an internal phase. With careful selection of surfactants, acceptable emulsions of polymerizable hydrocarbons and an aqueous phase can contain aqueous phase to hydrocarbon ratios of 30 to 60, resulting in a very open-celled and light final foam composition.

The emulsion can be applied to the substrate as a film, and can be impregnated into the substrate by, for example, pressing the emulsion into the substrate with rollers or by pressing the substrate and emulsion between plates. When the emulsion is cured as a layer on the substrate, pressing a portion of the emulsion into the substrate helps provide good adhesion between the substrate and the cured foam layer.

It is important that the surfaces of the cured foams remain as open celled foams. It has been found that a non-porous "skin" will form at the surface of the foam if the emulsion is cured exposed to non-polar materials. It is therefore important that the emulsion be cured with the emulsion surfaces contacting a polar surface (such as MYLAR® film or glass) or water.

The emulsion preferably forms as a layer of about 102 μm to about 203 μm (about four to about eight mils) in thickness over the substrate, with the foam penetrating at least partially into the substrate to ensure good adhesion thereto.

Although the present invention is described in greater detail as utilizing an emulsion comprising an aqueous phase of water and a salt, and a hydrocarbon phase comprising polymerizable hydrocarbon monomers and a surfactant, the emulsion could be formed with different combinations of immiscible phases, so long as the external phase contains polymerizable monomers. For example, inorganic soluble salts that precipitate to form an inorganic oxide matrix could be in an aqueous phase with an internal inert hydrocarbon phase. Alternatively, water soluble polymerizable monomers could be provided in an external aqueous phase, such as phenol-formaldehyde or resorcinol-formaldehyde. The two phases could be immiscible organic phases, with polymerizable monomers in one phase. For example, phenolic foams could be formed by a two phase mixture of hexane in aqueous phenol-formaldehyde resin.

An emulsion according to the present invention can be produced by forming a curable water-in-oil high internal phase emulsion by gradually adding and mixing an aqueous solution optionally containing an electrolyte into a monomer solution (oil phase) containing a mixture of polymerizable monomers and a surfactant. A polymerization initiator is added either in the monomer solution or the aqueous solution before mixing or after formation of the emulsion depending on the desired process conditions. The curable water-in-oil high internal phase emulsion is then cured (polymerized and crosslinked) by heating the emulsion to a temperature effective to crosslink and polymerize the monomers and for a time effective to cure the monomers.

The mixture of polymerizable monomers generally contains one or more vinyl monomers and one or more crosslinking agents. Various monomers may be used in the preparation of the foams, provided the monomers can be dispersed in or form an oil phase of a water-in-oil high internal phase emulsion (oil-soluble) and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene, isoprene, and piperylene; allenes such as allene, methyl allene and chloroallene; olefin halides such as vinyl chloride, vinyl fluoride and polyfluoro-olefins; and mixtures thereof.

Suitable crosslinking agents can be any multifunctional unsaturated monomers capable of reacting with the vinyl monomers. The crosslinking agents contain at least two functional groups. The functionality can be, for example, vinyl groups, acrylate groups and methacrylate groups. Multifunctional unsaturated crosslinking monomers include, for example, difunctional unsaturated crosslinking monomers such as divinylbenzene, diethylene glycol dimethacrylate, 1,3-butanediol dimethacrylate, and allyl methacrylate and tri-, tetra- and penta-functional unsaturated crosslinking monomers such as trimethylolpropane trimethacrylate, pentaerythritol tetramethacrylate, trimethylolpropane triacrylate, and pentaerythritol tetraacrylate, glucose pentaacrylate, glucose diethylmercaptal pentaacrylate, and sorbitan triacrylate; and poly-functional unsaturated crosslinking monomers such as polyacrylates (e.g. sucrose per(meth)acrylate and cellulose (meth) acrylate). Crosslinking monomers are typically present in each emulsion in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Divinylbenzene is a preferred crosslinking monomer, and is typically available as a mixture with ethyl styrene in proportions of about 55:45 by weight. These proportions can be modified so as to enrich the oil phase with one or the other component. Generally, it is advantageous to enrich the mixture with ethyl styrene which simultaneously reducing the amount of styrene in the monomer blend. The preferred ratio of divinylbenzene to ethyl styrene is from about 30:70 to 55:45, most preferably from about 35:65 to about 45:55, by weight. The inclusion of higher levels of ethylstyrene imparts greater toughness without increasing the $T_g$ of the resulting copolymer to the degree that styrene does.

Suitable polymerization initiators can be water-soluble or oil-soluble. Water-soluble initiators include, for example, persulfates such as potassium or sodium persulfate and various redox systems such as ammonium persulfate together with sodium metabisulfite. Oil soluble (monomer soluble) initiators include, for example, azo compounds such as azobisisobutyro-nitrile; and peroxides such as benzoyl peroxide, methyl ethyl ketone peroxide, alkylperoxycarbonates such as di-2-ethylhexyl peroxy-dicarbonate and di(sec-butyl)peroxydicarbonate and alkyl-peroxycarboxylates such as t-butyl peroxyisobutyrate, 2,5-dimethyl-2,5-bis(2,3-ethylhexanoylperoxy)hexane, and t-butyl peroctoate. The preferred water-soluble polymerization initiator is potassium persulfate and the preferred oil-soluble polymerization initiators are alkylperoxycarbonates and alkyl-peroxycarboxylates for fast curing time.

Most preferable alkylperoxycarbonates are branched at the 1-carbon position and most preferable alkylperoxy-carboxyl-ates are branched at the α-carbon position and/or 1-carbon position. These branched alkylperoxycarbonate peroxide can be represented by the formula:

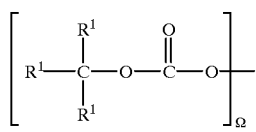

where $R^1$ is independently $C_1$ to $C_{16}$ hydrocarbons or hydrogen in which at least two of the $R^1$ are hydrocarbon groups.

The preferred branched alkyl carboxylate peroxide can be represented by the formula:

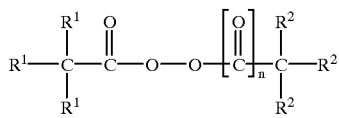

$n = 0, 1$ where $R^1$ and $R^2$ are independently $C_1$ to $C_{16}$ hydrocarbon groups or hydrogen in which at least two of the $R^1$ or $R^2$ are hydrocarbon groups. Preferably at least two of both $R^1$ and $R^2$ are hydrocarbon groups. Hydrocarbon groups can be alkyl, alkenyl or aryl groups.

The water-soluble initiators and/or oil-soluble initiators should be present in an effective amount to cure (polymerize and crosslink) the monomers. Typically the initiator can be present from about 0.005 to about 15 weight percent based on the monomers. The initiators can be introduced with the oil phase or the aqueous phase before or after formation of the high internal phase emulsion.

A water-soluble initiator such as potassium persulfate can be added to the aqueous solution before forming the emulsions or to the emulsions. An oil-soluble initiator can be added to the monomer solution or an advanced monomer solution or to the emulsion. Addition of a polymerization initiator to a high internal phase water-in-oil emulsion is described in U.S. Pat. No. 5,210,104, the disclosure of which is herein incorporated by reference. The initiator added to the emulsion can optionally be blended into the emulsion by any blending technique such as, for example, static mixer or a pin mixer at a low shear rate, to form a curable water-in-oil high internal phase emulsion. The rate of shear must be high enough to blend the initiator but low enough not to allow the emulsion to coalesce or liquify.

Conveniently, the initiators can be added to the oil phase (monomer phase) or aqueous phase prior to formation of the emulsion. Alternatively, at least a portion of the monomer solution can be advanced (partially polymerized) in the presence of an effective amount of an advancement initiator or by a free-radical-producing radiation source to produce an advanced monomer component prior to formation of the emulsion to reduce curing time.

To form a stable high internal phase emulsion requires that a surfactant be included in the emulsion.

Such surfactant must be soluble in the oil phase used to form the emulsion with the internal phase being aqueous. The surfactant may be nonionic, cationic, anionic or amphoteric provided the surfactant or combination of surfactants are effective to form a stable high internal phase emulsion. Preferred types of surfactants that can be used include sorbitan fatty acid esters, polyglycerol fatty acid esters, polyoxyethylene fatty acids and esters. In particular, sorbitan fatty acid esters such as sorbitan monolaurate ("SPAN® 20"), sorbitan monooleate ("SPAN® 80"), and combinations of sorbitan trioleate ("SPAN® 85"), and sorbitan monooleate. One such surfactant combination is the combination of sorbitan monooleate and sorbitan trioleate in a weight ration greater than or equal to about 3:1, more preferably about 4:1. Another acceptable surfactant is "TRIODAN® 20" which is a polyglycerol ester available from Grindsted and "EMSORB 252" which is a sorbitan sesquioleate available from Henkel.

Between about one and about thirty percent by weight of surfactant, based on the monomers in the oil phase, is generally sufficient, with higher water to oil ratios and higher mixing and curing temperatures generally requiring more surfactant than lower water to oil ratios and temperatures.

The type of surfactant used in making the high internal phase emulsions that are to be polymerized is important in forming water-in-oil high internal phase emulsion and effects the final properties of the polymerized foams obtained. The surfactants are typically added to the monomer phase (oil phase).

The amount of surfactant system must be such that a water-in-oil high internal phase emulsion will form, and does not break prior to curing being essentially complete. Generally, the surfactant system is present in an amount effective to form a water-in-oil high internal phase emulsion. Preferably, the surfactant system can be present in concentrations of from about 0.1 to about 40 weight percent, more preferably about one to about thirty weight percent based on the monomers of the particular emulsion. When saccharide fatty acid esters are used as a component of the surfactant the saccharide fatty acid surfactants are preferably present in an amount between about 0.1 weight percent and about 36 weight percent, more preferably from about 0.1 to about 25 weight percent based on the monomers. When sorbitan fatty acid esters are used as a component of the surfactant the sorbitan fatty acid ester surfactants are preferably present from about 2 weight percent to about 36 weight percent, more preferably from about 5 weight percent to about 25 weight percent based on the monomers.

The relative amounts of the aqueous phase containing water and an electrolyte and monomer phase containing monomers and surfactants used to form the high internal phase emulsions are a factor in determining the structural, mechanical and performance properties of the resulting polymeric foam phases. The ratio of water to oil in the emulsions can influence the density, cell size, and specific surface area of the foam phase. To form a polymeric foam phase with suitable density and high porosity, the water-in-oil high internal phase emulsions typically contain as the internal phase, at least about 70 weight percent of water, based on the emulsion, corresponding to a water to oil weight ratio of at least about 7:3, more preferably at least about 90 weight percent of water, most preferably at least about 95 weight percent of water, corresponding to a water to oil weight ratio of at least about 20:1.

The internal aqueous phase preferably contains a water-soluble electrolyte. This water-soluble electrolyte stabilizes the emulsion. Suitable electrolytes include inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of a water-in-oil emulsion is described in U.S. Pat. No. 4,522,953, and U.S. Pat. No. 5,149,720, the disclosures of which are incorporated herein by reference. In general, to form the water-in-oil emulsion, the water can be mixed in any way up to a water to oil ratio of about 4:1. An oil-in-water emulsion becomes preferred if the water was added all at once beyond a water to oil ratio of about 4:1. Typically, the water must be added gradually with a moderate rate of shear. A small capacity mixer such as a paint mixer with a shear rate of at least about 5 s$^{-1}$, preferably at least about 10 s$^{-1}$ can be used to mix the water-in-oil emulsion. A larger mixer equipped with an impeller with a shear rate of at least about 10 s$^{-1}$ or a pin gap mixer with a shear rate of at least about 50 s$^{-1}$, preferably at least about 100 s$^{-1}$ can also be used. If the shear rate is too low, the water-in-oil emulsion may revert to a oil-in-water emulsion.

A high internal phase emulsion can be prepared in batches or continuously. To form the high internal phase emulsion in batches, the emulsion is formed in a vessel or a container by gradually adding an aqueous phase to a monomer mixture and/or advanced monomer mixture under a moderate rate of shear until the desired water to oil ratio is reached.

A high internal phase emulsion can be prepared continuously by initially preparing a preformed emulsion of approximately the same character as the desired emulsion by the method described above, then introducing into the preformed emulsion, both the aqueous phase and/or the oil phase in such proportions so as to produce the desired emulsion. The emulsified mass is maintained in a state of continuous shear. The shear is sufficient to reduce the effective viscosity of the mass to about the effective viscosity of the introduced phase but not above the inherent shear stability point of the desired emulsion. The prepared emulsion is then withdrawn at the desired rate.

The aqueous phase and the monomer phase for the batch process and the continuous process can be introduced in a mixing vessel by an aqueous stream or a monomer stream, respectively, through one or more inlets. The streams can be combined prior to or after entering the mixing vessel then mixed in such a way to produce the desired emulsion. The mixing vessel is any container in which the high internal phase emulsion is made regardless of the type of mixer or mixer head used.

The curable water-in-oil high internal phase emulsions can be cured in a batch process or in a continuous process. The emulsion or aqueous stream or monomer stream can be heated prior to or after the addition of the initiator.

The emulsion is preferably polymerized and cured at a temperature within the range of about 25° C. to about 90° C., as long as the emulsion is stable at the curing temperature. Alternatively, a multiple-step process can be used. Such a multiple-step process is described in U.S. Pat. No. 5,189,070 issued Feb. 23, 1993, the disclosure of which is herein incorporated by reference. In the multi-step process the emulsion is pre-cured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure can be as high as about 175° C. under a pressure sufficient to prevent the aqueous phase from boiling.

The emulsions can be heated, for example, by hot water, hot air, steam, ERR, RP, microwave or ohmic heating. The emulsions should be cured until the desired properties are obtained. Typically, to obtain a cured foam, the emulsions should be cured for at least about 8 hours, at 60° C. or at least about 1 hour at 60° C. then 3 hours at a temperature of above about 70° C. Generally, the extent of reaction after curing is at least about 85% of the monomers, preferably at least about 90%, more preferably at least about 95% (i.e., less than about 5% free monomers remaining), most preferably at least about 99% (i.e., less than about 1% free monomers remaining) in order to obtain good properties.

These foams can be optionally post-cured to improve the foam properties. Post-curing of the foam can be carried out by heating the foams at a temperature of above about 75° C., preferably greater than 90° C. by steam, hot air, or other heating source. Such heating may be performed initially in a heat exchanger, oven, over heated rollers or by other means.

When the temperature is near or above the boiling point of water, pressure is preferably applied to keep the water in the liquid phase. Pressure can be applied to the emulsion, if desired, at a pressure generally from above atmospheric pressure, typically within the range of about atmospheric pressure to about 1.03 MPa (150 psig). When the temperature is about 100° C., a pressure from about 7 to 70 kPa gauge (about 1 to 10 psig) is sufficient; when the temperature is about 130° C., a pressure from about 210 to 480 kPa gauge (about 30 psig to 70 psig) is preferred. The preferred pressures will be from just above the autogenous steam pressure of the solution to about twice that absolute pressure.

For example, the emulsion can be cured under pressure by using an autoclave operating under autogenous pressure of steam generated from pure water at a given temperature, by applying nitrogen or air pressure to prevent boiling of the emulsion or by mechanical means, such as rollers, pistons, molds, or the like.

Once the curing and/or post-curing process is completed, the water incorporated in the foam may be removed or squeezed out, dried by heat or flashed by lowering the pressure to a suitable level to evaporate the remaining liquid to give the desired degree of dryness in the product foam. These drying techniques will preferably be used after the desired state of cure is developed in the foam material.

The foam containing filter material of the present invention may be washed prior to, after or between drying stages (removing at least a portion of the water). Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

The foams produced by the inventive process possess high porosities, low densities, small pore size, and uniform properties especially suitable for use as a filter material for, for example, bag house filters.

ILLUSTRATIVE EMBODIMENT

The following illustrative embodiments describe the process of the invention and are provided for illustrative purposes and do not limit the present invention.

All reagents and solvents used in the following examples were technical or reagent grade and were used without further purification unless otherwise noted. Divinylbenzene was 55% pure and contained a mixture of isomers. The inhibitor, t-butyl catechol, in both styrene and divinylbenzene remained present for the reaction.

TESTING METHODS

AIR PERMEABILITY TEST was performed by Grubb Filtration Testing Services of Delran, N.J. ASTM D737 was the test procedure. In this test, the flow rate of air passing through the filter is measured at a differential pressure of one half inch of water.

AIR FILTRATION EFFICIENCY TEST was performed by the University of Tennessee at Knoxville, Tenn. ASTM F1215 was the test procedure. An average dust particle size of one tenths of a micron was used.

EXAMPLE 1

A substrate of Lantor 542.5 g/m$^2$ (16 oz/yd$^2$) #1625 polyester felt, 1.59 mm (0.0625 inches thick was used. An emulsion was prepared having a water to hydrocarbon weight ration of 50. The hydrocarbon phase of the emulsion was 20 parts by weight styrene, 20 parts by weight divinylbenzene, 60 parts by weight ethylhexylacrylate, and 12 parts by weight SPAN® 20. The water contained ten percent by weight, based on the water phase, of calcium chloride and two tenths of a percent by weight potassium persulfate as an initiator for the polymerization. The water phase was slowly added to the oil phase as the mixture was stirred with a paint stirrer. An emulsion formed. The emulsion was then spread over a mylar sheet, and a felt placed over the emulsion. The weight ratio of emulsion to felt was about 1.5. A glass plate was then pressed onto the top of the felt to press a portion of the emulsion into the felt. The glass was then removed and the top of the felt wetted with water. The glass plate was then replaced with the space outside of the felt sealed with a rubber rope. The emulsion was them cured at about 60° C. for fifteen hours. A foam of a thickness of about one hundred to two hundred microns in thickness was formed at the surface of the felt, and was firmly attached to the felt.

Porosity of the foam phase, based on the weight ratio of water to oil, was about 98%. Average pore size of the foam phases would be expected to be about 40 μm (40 microns).

Filtration efficiency for the resultant product was 69% for an average dust particle size of 0.1 μm (0.1 micron), and flow through the filter was 0.093 m$^3$/5 per m$^2$ (18.4 ft$^3$/min per ft$^2$) under a differential pressure of 12.7 mm (0.5 inch) water.

For comparison, filtration efficiency and flow rate tests were performed on commercially available filter materials and the results are listed below in the TABLE.

TABLE

| COATING MATERIAL | FILTER MATERIAL | POROSITY | FLOW RATE[1] m$^3$/s per m$^2$ (ft$^3$/min per ft$^2$) | EFFICIENCY[2] |
|---|---|---|---|---|
| NONE | LANTOR 16 oz | 78% | 0.151 (29.8) | 28 |
| LANTOR PE-1000 | LANTOR PE-1000 | | 0.135 (26.5) | 29 |
| LANTOR PE-1001 | LANTOR PE-1001 | | 0.196 (38.5) | 30 |
| PTFE | GORETEX 16 oz | 82% | 0.050 (9.88) | 99 |
| PTFE | TETRATEX 6202 | | 0.038 (7.45) | 99 |
| PTFE | TETRATEX 6212 | | 0.044 (8.65) | 97 |
| PTFE | TETRATEX 6214 | | 0.068 (13.4) | 92 |

[1]flow rate through the filter under a differential pressure of 12.7 mm (0.5 inch) of water at atmospheric pressure and 25° C.
[2]percentage of test dust collected.

As can be seen from the TABLE, compared to the results of the example, greater efficiency can be achieved with polyterafluoroethylene filter materials, but only with a significant increase in pressure drop (or increase in surface area of the filter), and the cost of providing the PTFE is considerably greater than the filter material of the present invention. Other filter materials have considerably larger pore sizes, and as a result, are of significantly lower filtration efficiency. The present invention results in a filter medium of high efficiency, and considerably higher efficiency than other materials of similar cost.

What is claimed is:

1. A filter material prepared by a method, the method comprising the steps of:
   providing a felt substrate material;
   preparing a high internal phase emulsion wherein the external phase of the emulsion comprises polymerizable monomers, and the internal phase is an immiscible non-polymerizable phase;
   impregnating the high internal phase emulsion into the felt; and
   curing the emulsion with the emulsion surfaces contacting a polar surface → to provide an open celled foam.

2. The filter material of claim 1 wherein the immiscible non-polymerizable phase is an aqueous phase.

3. The filter material of claim 2 wherein the polymerizable monomers comprise one or more vinyl monomer and one or more crosslinking agent.

4. The filter material of claim 3 wherein the vinyl monomer is selected from the group consisting of styrene, α-methylstyrene, chloromethylstyrene, vinylethylbenzene, vinyl toluene, 2-ethylhexyl acrylate, n-butyl acrylate, isobutyl acrylate, t-butyl acrylate, hexyl acrylate, n-butyl methacrylate, lauryl methacrylate, isodecyl methacrylate, butadiene, isoprene, piperylene, allene, methyl allene, chloroallene, vinyl chloride, vinyl fluoride, polyfluoroolefins, and combinations thereof.

5. The filter material of claim 3 wherein the crosslinking agent contains at least two functional groups, the functional groups selected from the group consisting of vinyl groups, acrylate groups and methacrylate groups.

6. The filter material of claim 5 wherein the crosslinking agent is a multifunctional unsaturated monomers capable of reacting with the monomers, the crosslinking agents are selected from the group consisting of divinylbenzene, diethylene glycol dimethacrylate, 1,3-butanediol dimethacrylate, trimethylolpropane trimethacrylate, pentaerythritol tetramethacrylate, trimethylolpropane triacrylate, pentaerythritol tetraacrylate, glucose pentaacrylate, glucose diethylmercaptal pentaacrylate, sorbitan triacrylate, sucrose per(meth)acrylate and cellulose (meth)acrylate.

7. The filter material of claim 3 wherein the phase containing the polymerizable monomers further comprises a surfactant selected from the group consisting of sorbitan fatty acid esters, polyglycerol fatty acid esters, polyglycerol fatty acid esters, polyoxyethylene fatty acids and esters and combinations thereof.

8. The filter material of claim 7 wherein the aqueous phase further comprises a free-radical initiator effective to initiate polymerization of the polymerizable monomers.

* * * * *